US008201026B1

(12) United States Patent
Bornstein et al.

(10) Patent No.: US 8,201,026 B1
(45) Date of Patent: Jun. 12, 2012

(54) FAULT-RESISTANT JUST-IN-TIME COMPILER

(75) Inventors: Daniel R. Bornstein, San Francisco, CA (US); Ben C. Cheng, Cupertino, CA (US); William B. Buzbee, Half Moon Bay, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,513

(22) Filed: Sep. 30, 2011

Related U.S. Application Data

(63) Continuation of application No. 12/872,822, filed on Aug. 31, 2010.

(51) Int. Cl.
*G06F 11/00* (2006.01)

(52) U.S. Cl. .......................................... 714/45; 717/148
(58) Field of Classification Search .......................... None
See application file for complete search history.

(56) References Cited

U.S. PATENT DOCUMENTS

| | | | | |
|---|---|---|---|---|
| 6,311,325 B1 * | 10/2001 | Levine et al. | ................. | 717/128 |
| 6,332,216 B1 | 12/2001 | Manjunath | | |
| 6,363,521 B1 * | 3/2002 | Yasue et al. | ................. | 717/128 |
| 6,604,167 B1 * | 8/2003 | Blandy et al. | ................. | 711/100 |
| 6,738,965 B1 * | 5/2004 | Webster | ....................... | 717/128 |
| 7,103,881 B2 * | 9/2006 | Stone | ........................ | 717/148 |
| 7,600,221 B1 * | 10/2009 | Rangachari | ................. | 717/128 |
| 7,725,885 B1 * | 5/2010 | Pradhan et al. | ................ | 717/148 |
| 7,840,950 B2 * | 11/2010 | Stoodley et al. | ................ | 717/151 |
| 7,958,499 B2 * | 6/2011 | Doi et al. | ....................... | 717/148 |
| 2002/0108106 A1 * | 8/2002 | Kramskoy et al. | ............. | 717/148 |
| 2002/0112227 A1 * | 8/2002 | Kramskoy et al. | ............. | 717/148 |
| 2007/0074191 A1 * | 3/2007 | Geisinger | ...................... | 717/148 |
| 2007/0294671 A1 * | 12/2007 | Demetriou et al. | ............ | 717/124 |
| 2009/0187750 A1 * | 7/2009 | Bugnion | ........................ | 712/244 |
| 2009/0307528 A1 * | 12/2009 | Byers et al. | ...................... | 714/32 |
| 2010/0138820 A1 * | 6/2010 | Joshi | ................................ | 717/158 |
| 2011/0029960 A1 * | 2/2011 | Cimadamore et al. | ......... | 717/141 |
| 2011/0071816 A1 * | 3/2011 | Bohizic et al. | ................... | 703/26 |
| 2011/0265067 A1 * | 10/2011 | Schulte et al. | ................. | 717/148 |

OTHER PUBLICATIONS

U.S. Appl. No. 12/872,822, by Daniel R. Bornstein, filed Aug. 31, 2010.

* cited by examiner

*Primary Examiner* — Christopher McCarthy
(74) *Attorney, Agent, or Firm* — Shumaker & Sieffert, P.A.

(57) ABSTRACT

The present disclosure relates to techniques for potentially increasing the reliability and/or stability of systems having virtual machines that support multiple modes of execution. For example, as described herein, a virtual machine partitions a plurality of program instructions into a plurality of traces for execution by a virtual machine operating on a computing device, wherein the virtual machine has first and second modes of execution, and wherein each of the plurality of traces comprises one or more of the plurality of program instructions. The virtual machine applies the second mode of execution to a first trace in the plurality of traces and determines an error condition that is caused by the application of the second mode of execution to the first trace. After determining the error condition, the virtual machine applies the first mode of execution to the first trace to recover the virtual machine from the error condition.

21 Claims, 5 Drawing Sheets

FAULT-RESISTANT JUST-IN-TIME COMPILER

This application is a continuation of U.S. application Ser. No. 12/872,822, filed Aug. 31, 2010, the entire content of which is incorporated herein by reference.

TECHNICAL FIELD

This disclosure relates to the use of virtual machines in a computing environment and, more specifically, to implementations involving just-in-time compilation.

BACKGROUND

Systems that employ a virtual machine (VM) typically execute platform-independent program code by way of an interpreter that directly executes such code. To improve execution performance, many VMs also support just-in-time (JIT) compilation of all or portions of platform-independent program code to native machine code at run-time using a JIT-compiler. These VMs thus support dual modes of execution for any particular segment of platform-independent program code. That is, the VMs can either execute the program code by interpreting it or by compiling it using a JIT-compiler and then executing the compiled code natively. An execution thread for a process may alternate between modes by interpreting some segments of the program code and running JIT-compiled (or "JITted") machine code for other segments.

SUMMARY

In general, this disclosure is directed to techniques for increasing the reliability and stability of systems having virtual machines that support multiple modes of execution. The disclosure describes techniques for discovering incorrect or system-destabilizing operation by a just-in-time (JIT) compiler for a virtual machine (VM). In one example, the techniques include verifying the operation of the JIT-compiler by comparing execution results of machine code generated by the JIT-compiler with the execution results of a VM interpreter. After the initial execution of a program code segment, or "trace," that has been JIT-compiled, the VM compares the outcome of the JITted code with previous or concurrently-derived results from the interpreter to determine whether there is a divergence. A divergent outcome may be identified, for instance, by comparing the resultant register values from executing the JITted program code with a shadow copy of the register values generated by interpreting the same trace. In a similar manner, the VM may identify divergent outcomes by analyzing the heap, the stack, a core dump due to a system crash, or other means. In the case of divergence, the VM logs the issue and marks the JITted code to prevent its further execution in favor of interpreted execution of that trace. In the case of identical outcomes, the JITted code is trustworthy and the VM removes any verification hooks to cause future execution of the compiled trace to operate at full speed.

In another described example, the techniques include modifying the JIT-compiler to catch system errors caused by executing the compiler. When the modified JIT-compiler catches a system error during compilation of a particular trace, the JIT-compiler attempts to determine the identity of the trace. If the JIT-compiler determines the error-causing trace, the JIT-compiler marks the trace in the JIT profiling table, a table that includes a list of traces and is used by the VM interpreter to drive the code execution alternatively using the JIT-compiler/native execution and using the interpreter. The interpreter thereafter avoids passing marked traces to the JIT-compiler to avoid further system errors. In addition, the modified JIT-compiler may log the system error. The modified JIT-compiler thereafter attempts to process additional traces.

In yet another described example, the techniques include modifying the VM to catch system errors triggered by an interpreter thread. The modified VM, in the error handler, attempts to determine whether it had handed off execution to a compiled trace and, if so, attempts to determine the identity of the compiled trace. If the VM is unable to make the compiled trace determination, it logs the context of the error and permits the interpreter thread to abnormally terminate (i.e., crash) the VM. Upon determining an identity of a failed trace, however, the VM marks the identified trace in the JIT profiling table and/or in non-volatile storage for future use. For example, in instances where the VM allows the interpreter to crash the VM process, a later interpreter instance may query the non-volatile storage for identifying characteristics of failed compiled traces to avoid attempting to execute such compiled traces again.

In addition, the modified VM attempts to "roll back" the error-causing thread to a restore point, i.e., a state from which the VM is able to recover and achieve a correct outcome. Traces may, in some instances, execute past a "point of no return" from which recovery may not be possible. In such instances, the modified VM permits itself to crash from the system error handler. If roll back is possible, however, the VM restores the thread to the trusted state and interprets the trace that had caused the system error when executed in compiled form. The roll back techniques specify modifying the JIT-compiler to create restore points and associate actions required to roll back the thread to a restore point from each potential failure location.

In one embodiment, a method comprises partitioning a plurality of program instructions into a plurality of traces for execution by a virtual machine operating on a computing device, wherein the virtual machine has first and second modes of execution, and wherein each of the plurality of traces comprises one or more of the plurality of program instructions. The method further comprises the steps of applying the second mode of execution to a first trace in the plurality of traces, and determining an error condition caused by the application of the second mode of execution to the first trace. The method further comprises the step of, after determining the error condition, applying the first mode of execution to the first trace to recover the virtual machine from the error condition.

In another embodiment, a non-transitory computer-readable medium contains instructions that cause a programmable processor to partition a plurality of program instructions into a plurality of traces for execution by a virtual machine operating on a computing device, wherein the virtual machine has first and second modes of execution, and wherein each of the plurality of traces comprises one or more of the plurality of program instructions. The instructions further cause the programmable processor to apply the second mode of execution to a first trace in the plurality of traces, and determine an error condition caused by the application of the second mode of execution to the first trace. The instructions further cause the programmable processor to, after determining the error condition, apply the first mode of execution to the first trace to recover the virtual machine from the error condition.

In another embodiment, a computing device comprises one or more processors and a virtual machine operable by the one or more processors to apply first and second modes of execution to a plurality of traces for execution, wherein each of the plurality of traces comprises one or more program instructions. The computing device further comprises means for determining whether an application by the virtual machine of the second mode of execution to a first trace in the plurality of traces causes an error condition, wherein the virtual machine applies the first mode of execution to the first trace to recover the virtual machine from the error condition when the second mode of execution to the first trace causes the error condition.

The techniques described in this disclosure may have one or more advantages. For example, verifying the operation of a JIT-compiler for a system by comparing execution results of machine code generated by the JIT-compiler with the execution results of a VM interpreter may enable the system to ensure correct operation with respect to the program code. Correct operation of the system, in this instance, is determined according to the more reliable mode of execution, i.e., interpreting the code with the VM interpreter. Furthermore, the logging techniques may allow developers to identify and ameliorate errors (e.g. bugs) in the JIT-compiler. As another example, modifying the JIT-compiler to catch system errors that arise during JIT-compiler execution may enable the VM to avoid further executing compiled traces that result in system errors, increasing system stability and improving performance. As a still further example, modifying the VM to catch system errors triggered by an interpreter thread and, when possible, rolling back the error-causing thread to a restore point may improve performance of the system by permitting the interpreter thread to continue in lieu of allowing the process to crash. The techniques may thus allow the system to be more fault-resistant with respect to faults caused by an improper operation of the JIT-compiler.

The details of one or more embodiments are set forth in the accompanying drawings and the description below. Other features, objects, and advantages of the disclosure will be apparent from the description and drawings, and from the claims.

DETAILED DESCRIPTION

Figure 1:
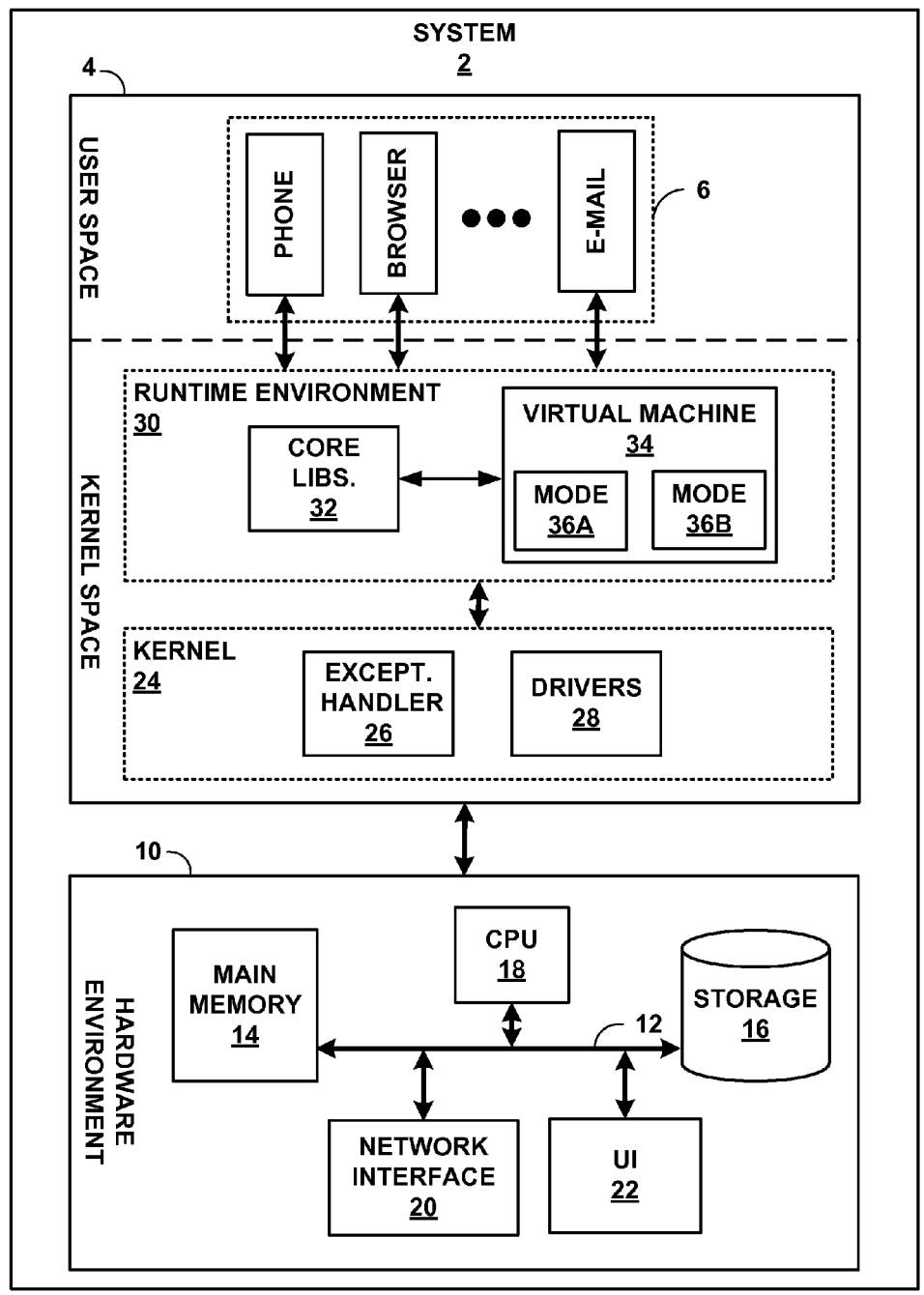
FIG. 1 is a block diagram illustrating an example system that may be configured to implement one or more of the fault-resistant techniques described in this disclosure.

FIG. 1 is a block diagram illustrating an example computing system 2 ("system 2") that includes a software stack 4 executing in an operating environment provided by hardware environment 10. System 2 may comprise a desktop/laptop computer, a hand-held device such as a mobile telephone, a gaming console, or other computing device.

Hardware environment 10 of system 2 comprises central processing unit 18 ("CPU 18"), main memory 14, non-volatile storage 16 ("storage 16"), user interface 22 ("UI 22"), and network interface 20 interconnected via system bus 12. System bus 12 may comprise one or more auxiliary busses each operating one of a variety of bus protocols. User interface 22 comprises peripherals to enable interaction between a user and system 2. For example, UI 22 may include a display, such as a liquid crystal display (LCD), a mouse, a touchscreen, a keyboard, speakers, a microphone, or other peripherals. Network interface 20 is wireless or wired interface by which system 2 exchanges data with other networked devices.

CPU 18 executes program instructions loaded into main memory 14 from storage 16 in order to operate software stack 4. CPU 18 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure suitable for implementation of the techniques described herein.

Storage 16 comprises non-transitory, computer-readable media, such as computer-readable storage media, that includes volatile and/or non-volatile, removable and/or non-removable media implemented in any method or technology for storage of information such as processor-readable instructions, data structures, program modules, or other data. Non-transitory, computer-readable media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by other components of system 2.

Main memory 14 comprises one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by other components of system 2. In some embodiments, main memory 14 is non-transitory. Main memory 14 provides a physical address space composed of addressable memory locations for software stack 4.

Software stack 4 includes user processes 6 executing over a runtime environment 30 having components executing on kernel 24. Kernel 24 manages hardware environment 10 using drivers 28 and receives system error indications from hardware environment 10 components via exception handler 26 ("except. handler 26"). Exception handler 26 also handles exceptions thrown by kernel 24 in response to, for example, impermissible user-level instructions. For instance, kernel 24 may throw a protected memory exception for handling by exception handler 26. Exception handler 26 propagates exceptions to virtual machine 34 for virtual machine 34 and/or user process 6 inspection and handling. Kernel 24 may implement, in cooperation with hardware environment 10 components, a virtual memory system to extend the memory space available to software stack 4.

Kernel 24 may comprise, for example, a Linux kernel or other Unix variant kernel. Virtual machine 34 and core libraries 32 provide a runtime environment 30 that supports the execution of user processes 6. Some aspects of system 2 may support multiple instances of virtual machine 34. For example, each of user processes 6 may operate in a separate process virtual machine to insulate user processes from one another. That is, in such embodiments, each of user process 6 operates in a separate instance of virtual machine 34. Some aspects of system 2 may implement a system virtual machine that provides a virtual architecture over hardware environment 10.

Virtual machine 34 is a virtual execution environment that executes program code for user processes 6. Software for user processes 6 executing on virtual machine 34 may comprise machine independent program instructions (hereinafter, "program code") in the form of bytecode or other computer intermediate language generated by an intermediate compiler. Examples of intermediate languages include Dalvik bytecode (available from the Android Open Source Project), Java bytecode (available from Oracle Corporation), and Microsoft.NET Common Intermediate Language (CIL) (available from Microsoft Corporation of Redmond, Wash.).

Virtual machine 34 employs multiple execution modes 36A and 36B (collectively, "execution modes 36") with which to execute program code. Each of execution modes 36 represents an alternative mechanism by which virtual machine 34 executes program code for each of user processes 6. For example, one of execution modes 36 may represent an interpreter that directly executes source code written in a high-level language (e.g., Lisp, Perl, or SmallTalk). As another example, program code may be interpreted by virtual machine 34 employing one of execution modes 36. As a still further example, one of execution modes 36 may include a just-in-time (JIT) compiler or an ahead of time (AOT) compiler that compiles program code to native machine code and dispatches the machine code to CPU 18 for native execution. In some aspects, virtual machine may employ modes of execution in addition to execution modes 36. In various embodiments, execution modes 36 may each execute in virtual machine 34 as one or more separate threads or execution modes 36 may alternate between a single thread.

In the illustrated example, execution modes 36A and 36B have divergent performance characteristics, resource needs, and/or other characteristics. By segmenting program code for one of user processes 6, virtual machine 34 may selectively apply either execution mode 36A or 36B to various segments of the same process program code by determining the execution mode for a respective segment (or "trace") that provides comparatively better performance with regard to, for example, user experience, memory usage, speed, and the like. A single trace may represent a file, a method or collection of methods, a loop or other backward branch, or another program code grouping.

In accordance with the techniques of this disclosure, after virtual machine 34 delegates (or "dispatches") a particular trace to execution mode 36B for the first time, virtual machine 34 verifies the trace result, as generated by execution mode 36B, by comparing the result to a trace result produced by the other execution mode 36A. That is, virtual machine 34 applies both execution mode 36A and 36B to the same trace to generate corresponding trace results for the respective execution modes. Virtual machine 34 then verifies the operation of execution mode 36B with respect to the trace by comparing the result produced by execution mode 36B with the result produced by execution mode 36A.

To compare trace results, virtual machine 34 monitors a state of system 2. Each of execution modes 36 may monitor one or more components of system 2 when executing a particular trace and/or inspect such components after executing the trace. For example, execution mode 36B, in the course of performing a trace, may (or may not) modify CPU 18 registers, main memory 14, virtual machine 34 components (e.g., virtual registers, stack, and/or heap), or other components of system 2. Virtual machine 34 determines the state of system 2 caused by applying execution mode 36B to the trace. If the state is different than the state of system 2 that results from applying execution mode 36A to the same trace, then virtual machine 34 flags the trace as having produced divergent results.

In some embodiments, virtual machine 34 first applies execution mode 36A to a trace, stores a first result corresponding to execution mode 36A, and then applies execution mode 36B to the trace to obtain a second result corresponding to execution mode 36B. Virtual machine 34 then compares the first and second results to determine whether execution modes 36 produce divergent results. In some embodiments, virtual machine 34 creates a shadow copy of the virtual machine context (e.g., the virtual registers, stack, and/or heap) and executes execution modes 36 concurrently. Virtual machine 34 then compares the respective results produced by the execution modes to identify divergence.

If the respective trace results from execution modes 36A and 36B match, virtual machine 34 thereafter executes the verified trace using execution mode 36B and eschews additional verification of the verified trace. If, however, the respective trace results diverge, virtual machine 34 thereafter executes the flagged trace using execution mode 36A. Where execution mode 36A is more reliable than execution mode 36B, these techniques may ensure the correct operation of system 2 with respect to the flagged trace.

In some embodiments, execution mode 36B includes an error handler to receive system errors caused by executing a particular trace. For example, the error handler may be triggered by exception handler 26 responding to system error indications from hardware environment 10 components (e.g., a system bus 12 error). As another example, the error handler may be triggered by kernel 24 (e.g., a protected memory exception).

When the error handler of execution mode 36B receives a system error while executing a trace, the error handler attempts to identify the trace that execution mode 36B was executing and that resulted in the system error. If the error handler successfully identifies the error-causing trace, the error handler marks the trace. Thereafter, execution mode 36A executes the marked trace rather than execution mode 36B. The error handler regardless of whether it successful identified the error-causing trace, logs the error to notify developers to facilitate diagnostics and error remediation. Upon handling the error, the error handler returns to execution mode 36B, which processes subsequent traces.

In some embodiments, virtual machine 34 includes an error handler to receive system errors that are triggered during execution of a trace by either execution mode 36A or execution mode 36B. For example, the virtual machine 34 error handler may be triggered by exception handler 26 responding to system error indications from hardware environment 10 components (a system bus 12 error, for instance). As another example, the error handler may be triggered by kernel 24 (a protected memory exception, for instance).

When the virtual machine 34 error handler receives a system error, the virtual machine 34 attempts to determine whether execution mode 36B caused the system error. That is virtual machine 34 attempts to determine whether a trace execution by execution mode 36B caused the system error. In some instances, this determination may involve virtual machine 34 attempting to determine whether that active thread for the virtual machine process had entered execution mode 36B.

If virtual machine 34 is unable to identify execution mode 36B as triggering the system error, virtual machine 34 logs the error to notify developers to facilitate diagnostics and error remediation and then crashes to return execution control to kernel 24. If, however, virtual machine 34 identifies execution mode 36B as triggering the system error, virtual machine 34 marks the error-causing trace being executed in execution mode 36B. Thereafter, virtual machine 34 uses execution mode 36A to execute the marked trace.

In some instances virtual machine 34 may attempt to rewind, or "roll back," the execution thread to an earlier state. That is, in such instances, virtual machine 34 attempts to undo changes to the virtual machine 34 context (e.g., virtual machine registers, stack, and/or heap), any of user processes 6, main memory 14, and/or other system 2 components caused by executing the error-causing trace.

To roll back an execution thread, virtual machine 34 determines whether the error-causing trace has executed past a "point of no return," beyond which no roll back may be possible. If so, virtual machine 34 may terminate (i.e., crash) and return control to kernel 24. If roll back is possible, virtual machine 34 uses a previously stored system state read from, e.g., main memory 14 or storage 16, to restore system 2 components to an earlier state. In some embodiments, virtual machine 34 executes instructions associated with the error-causing trace to attempt to roll back the trace to a restore point.

The techniques described above may enable virtual machine 34 to ensure correct operation with respect to program code traces. Furthermore, the logging techniques may allow developers to identify and ameliorate errors in execution mode 36B operating "in the field." As another example, catching system errors in an error handler of execution mode 36B may enable virtual machine 34B to avoid further executing the trace that cause system errors, increasing system stability and improving performance. As a still further example, catching system errors triggered by either of execution modes 36 in a virtual machine 34 error handler and, when possible, rolling back the error-causing thread to a restore point may improve performance of the system by permitting the virtual machine 34 process to continue executing rather than crash. The techniques may thus allow the system to be fault-resistant, or to improve fault resistance, with respect to faults caused by execution mode 36B without significantly impacting performance.

Figure 2:
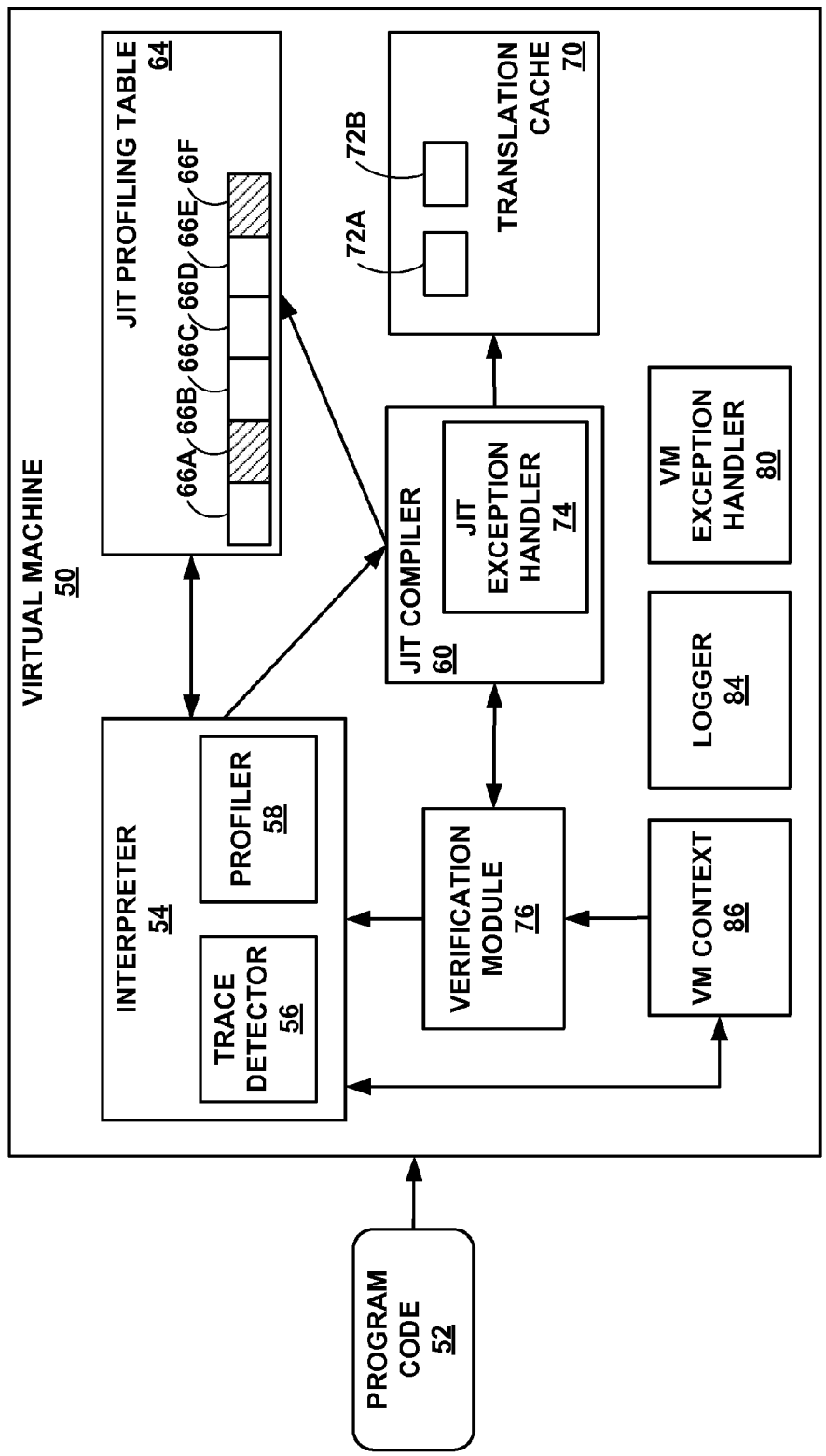
FIG. 2 is a block diagram illustrating an example virtual machine that includes multiple execution modes and exception handlers to perform one or more of the fault-resistant mixed-mode execution techniques of this disclosure.

FIG. 2 is a block diagram of a virtual machine 50 that includes multiple execution modes and exception handlers to perform the fault-resistant mixed-mode execution techniques of this disclosure. Virtual machine 50 may represent an embodiment of virtual machine 34 of FIG. 1.

Interpreter 54 receives and interprets program code 52 using virtual machine context 86, which maintains state for the virtual machine 50 process. Virtual machine context 86 includes, for example, virtual machine registers, heap, stack, program counter, stack counter, and/or other process context information. Virtual machine context 86 may be implemented using main physical or virtual memory. Program code 52 may include high-level source code, an intermediate representation of source code such as byte code, or other code executable by interpreter 54 of virtual machine 50. Interpreter 54 may represent an embodiment of execution mode 36A of FIG. 1.

To increase the execution speed of program code 52, interpreter 54 selectively employs Just-in-Time (JIT) compiler 60 to compile selected traces within program code 52 to native machine code. Trace detector 56 of interpreter identifies traces within the program code and, for each trace identified, creates a new JIT profile in JIT profiling table 64 and associates the trace with the new entry. In some instances, trace detector 56 identifies potential traces for compilation by detecting backward branches, recording the destination address of the backward branch target, and storing the destination address to the associated JIT profile. This destination address is also referred to herein as a trace-head. A trace-head may alternately refer to a beginning of a method, a start of a file comprising executable instructions, or other representation of a beginning of a set of instructions. In some instances, trace detector 56 may use other methods to identify potential traces for compilation, such as identifying methods as traces and storing, as trace-heads, function pointers for the methods to an associated JIT profile, or identifying classes or files as traces.

Each of JIT profiles 66A-66F (collectively, "JIT profiles 66") is a record, associated with a particular trace, that stores counters, flags, exit (e.g. jump) instruction addresses, and/or other information respecting the associated trace. In addition, each of JIT profiles 66 stores a counter that represents a number of times the trace has been executed by interpreter 54, as well as a flag that indicates whether a trace has been compiled to native code. In accordance with the techniques of this disclosure, each of JIT profiles 66 also includes a flag that indicates whether, as described in further detail below, an associated trace for the JIT profile could not be verified or is associated with a JIT-compiler or system error. JIT profiling table 64 may store JIT profiles 66 in, for example, a hash table keyed by the trace-head. In such instances, interpreter 54 components perform a hashing function on the trace-head to lookup the corresponding one of JIT profiles 66. JIT profiling table 64 and JIT profiles 66 may be stored in main memory and, in some instances, may be stored in non-volatile storage (e.g., a flash drive) to allow virtual machine 50 components to reuse trace information from previous invocations.

As interpreter 54 executes program code 52, profiler 58 of interpreter 54 monitors execution of traces identified by profiler 58. When a trace is executed, profiler 58 updates a counter for the trace in the associated one of JIT profiles 66. For example, profiler 58 may increment a counter for a trace when the trace-head is executed or, in another example, when a backward branch instruction that targets the trace-head is executed. Some embodiments of virtual machine 50 do not include profiler 58 and instead select each identified trace for compilation.

When a counter for a JIT profile exceeds a threshold, profiler 58 sends the trace to JIT compiler 60 for compilation to native machine code. In some instances, after selecting a trace for compilation, profiler 58 first "records" the program code instructions of the trace as the trace is being executed. Profiler 58 then sends the recorded instructions to the JIT compiler for compilation.

JIT compiler 60 attempts to compile traces received from interpreter 54 and, when successful, installs the compiled traces to translation cache 70. Translation cache 70 may be implemented using a non-volatile or volatile storage medium to cache compiled traces 72A-72B (collectively, "compiled traces 72"). Each of compiled traces 72 comprises a block of native machine instructions and may be identified, for example, by a first memory address for the respective trace in the storage medium (or a corresponding virtual address), or by an association (e.g., a pointer or other reference) with one of JIT profiles 66. JIT compiler 60 may string together, for execution, multiple compiled traces 72. The execution by virtual machine 50 of the native machine code of compiled traces 72 may represent execution mode 36B of FIG. 1. In some embodiments, interpreter 54 spawns a new thread for JIT compiler 60 such that interpreter 54 may continue interpreting program code 52 while JIT compiler compiles traces.

In accordance with the techniques of this disclosure, JIT compiler 60 includes JIT compiler exception handler 74 (illustrated as "JIT exception hander 74") to catch exceptions raised during compilation of a trace. Such exceptions may be raised by JIT compiler 60, other virtual machine 50 components, or by system hardware and software components that provide an operating platform for the virtual machine. For example, JIT compiler exception handler 74 may catch an out of memory exception throw by the operating system indicating, for instance, that JIT compiler 60 as implemented has a memory leak bug. As another example, JIT compiler exception handler 74 may catch a system bus error exception thrown by a driver that indicates JIT compiler 60 as implemented attempted to access a memory at a non-existent or misaligned physical memory address.

Responsive to catching an exception, JIT compiler exception handler 74 attempts to identify the trace being compiled by JIT compiler 60 at the time of the exception. When JIT compiler exception handler 74 successfully identifies the trace, the exception handler marks the associate one of JIT profiles 66 to indicate the trace causes JIT compiler 60 to receive an exception. In one example, JIT compiler 60 records a reference (e.g., a pointer) to the associated one of JIT profiles 66 for the trace in VM context 86. When JIT exception handler 74 receives an exception, the exception handler reads the reference from VM context 86 and sets a flag (e.g., a Boolean value) in the referenced one of JIT profiles 66 to indicate the associated trace causes JIT compiler 60 to receive an exception.

In another example, JIT compiler exception handler 74 receives an exception and attempts to determine a trace-head for a trace using the instructions received for compilation by JIT compiler 60 from interpreter 54. If successful, the JIT compiler exception handler 74 keys the trace-head to one of JIT profiles 66 and, as in the previous example, sets a flag in the entry. In the illustrated embodiment, JIT profiles 66B and 66F are hashed to represent a mark for these entries that indicates the traces associated with the entries result in system errors during compilation or native execution.

In addition to marking, when possible, error-causing traces in JIT profiling table 64, JIT exception handler 74 directs logger 84 of virtual machine 54 to log information regarding the caught exception, such as the type of exception, the contents of aspects of VM context 84 (e.g., the VM stack or VM registers), and the trace instructions for the trace being compiled. In general, logger 84 of virtual machine 54 receives information from other components of virtual machine 54 and records the information for future inspection by, for example, a system developer/programmer. Logger 84 may, for example, store the information to a log file in non-volatile storage, send a message (e.g., an email) including the information to a developer or a central report repository, or render the information on a user interface. After handling the exception, JIT exception handler 74 returns to JIT compiler 60, which proceeds to compile additional traces or returns process control to interpreter 54.

According to the techniques of this disclosure, verification module 76 of virtual machine 50 validates the operation of a compiled trace by comparing the results of the compiled trace execution with the results for a corresponding non-compiled trace as interpreted by interpreter 54. That is, verification module 76 determines whether the results generated by a trace that is JIT-compiled and executed as native machine code match the results generated by the trace when interpreted.

JIT compiler 60 modifies corresponding JIT profiles 66 for the compiled traces 72 to indicate the traces are compiled. For example, JIT compiler 60 may modify respective JIT profiles 66 to include a memory address of the compiled trace in translation cache 70. In this manner, interpreter 54 dispatches execution of the compiled trace by starting a new thread or continuing a current thread at the memory address of the compiled trace. As another instance, JIT compiler 60 may set a flag in respective JIT profiles 66 to indicate the corresponding trace is compiled. In such instances, when interpreter 54 prepares to interpret a trace, the interpreter checks whether the flag is set and, if so, dispatches a thread to the corresponding one of compiled traces 72 in lieu of interpreting the trace.

In some embodiments, when interpreter 54 dispatches a particular one of compiled traces 72, the interpreter queries the corresponding one of JIT profiles 66 to determine whether a flag is set to indicate the compiled trace is being dispatched for native execution for the first time. If so, interpreter 54 notifies verification module 76 to cause the verification module to perform verification techniques for the dispatched trace.

In some embodiments, JIT compiler 60 inserts verification hooks into compiled traces 72 and stores the compiled traces 72 to translation cache 70. In general, a verification hook comprises instructions, such as a procedure call, to cause the active thread to enter verification module 76 when executed. Verification module 76 then performs the verification techniques for the calling trace.

To validate the operation of a compiled trace, verification module 76 directs both native execution of the compiled trace as well as the interpretation, by interpreter 54, of the corresponding program code trace. To obtain comparable results for both execution modes, the native execution and interpreter 54 begin execution of a trace with a comparable system state. That is, after performing one of the execution modes, verification module 76 restores virtual machine 50 to a state that is identical, at least in some respects, to the virtual machine state prior to performing the execution mode.

To restore virtual machine 50 state, verification module 76 may store all or aspects of VM context 86, as a first copy of the system state to main memory or non-volatile storage prior to performing the first execution mode. After performing the execution mode, the verification module 76 makes a second copy of all or aspects of VM context 86, as modified by the first execution mode, to main memory or non-volatile storage. Verification module 76 then restores the first copy of the system state to VM context 86 to undo any modifications caused by performing the first execution mode, and verification module 76 then performs the second execution mode. In this way, verification module 76 enables the two execution modes, interpreter 54 and native execution, to generate comparable results.

For example, verification module 76 may store a first copy of VM context 86 to non-volatile storage prior to executing compiled trace 72A in translation cache 70. Verification module 76 then stores a second copy of VM context 86 as modified by compiled trace 72A and restores the VM context 86 to the pre-execution state using the earlier first copy of the virtual machine context. Verification module 76 directs interpreter 54 to interpret the corresponding program code trace for compiled trace 72A. As a result, the second stored copy of VM context 86 is comparable to the current state of VM context 86.

In some embodiments, verification module 76 and/or JIT compiler 60 may reduce the amount of system state necessary to store for restoration/comparison by analyzing a trace and determining particular state variables that may be modified due to execution of the trace. In this way, verification module 76 need only store a subset of system state variables, rather than the full system state. For example, verification module 76 may determine that only virtual machine registers and particular object (e.g., a class instance) data members will be modified upon execution by trace 72A. Verification module 76 may therefore store only a shadow copy of the VM registers of VM context 86, as well as the data at memory address in the VM stack or VM heap that store the object data member values. This technique may reduce verification time and memory utilization.

After both interpreter 54 and native execution generate results for a particular trace, verification module 76 compares the respective results to determine whether the results match. That is, verification module 76 determines whether the second copy of VM context 86 (or relevant subset thereof) stored after performing a first execution mode (either interpretation or native code execution) matches the current VM context 86 (or relevant subset thereof). For example, verification module 76 may compare each of the respective values of the second copy of VM context 86 and the currently VM context 86.

If both execution modes reach a consistent result as evidenced by matching VM contexts, this may indicate correct operation of JIT compiler 60 with respect to compiling the trace. As a result, verification module 76 modifies virtual machine 50 to avoid future verification of the trace. In one exemplary embodiment, verification module 76 clears a flag in the corresponding one of JIT profiles 66 for the trace to indicate that the corresponding compiled trace 72 has been previously executed and verified. In another exemplary embodiment, verification module 76 removes any verification hooks from the recently verified trace by, for example, replacing the hooks with nop (i.e., "no operation") instructions. As a result, subsequent dispatches of the trace will no longer invoke verification module 76.

If the execution mode results fail to match as determined by verification module 76, the verification module directs logger 84 to log information regarding the failure. Logger 84 may log, for example, the full program code or trace-head instruction for the failed trace, the compiled code for the failed trace, and/or the respective results (e.g., a core dump of VM context 86 and the copy of VM context 86 created after performing the first execution mode). In addition, verification module 76 sets a flag in the corresponding one of JIT profiles 66 for the trace to indicate the compiled version of the trace could not be verified and that, therefore, the trace is to be executed (i.e., interpreted) by interpreter 54 in lieu of native execution. In some embodiments, verification module 76 modifies the trace-head to prevent the execution thread from jumping to the corresponding one of compiled traces 72.

In accordance with the described techniques, virtual machine 50 further comprises virtual machine exception handler 80 ("VM exception handler 80") to catch exceptions thrown by interpreter threads of interpreter 54. VM exception handler 80 may in some instances handle exceptions "bubbled-up" by JIT compiler 60. Catching an exception may in some instances refer to receiving a system error.

Exceptions thrown by interpreter threads of interpreter 54 may include exceptions thrown while an interpreter thread is natively executing one of compiled traces 72 of translation cache 70. That is, compiled traces 72 may in some instances cause system errors that result in an exception during native execution.

VM exception handler 80, upon catching an exception, attempts to determine whether the active thread threw the exception while executing one of compiled traces 72 and attempts to identify the error-causing trace. In one example, VM exception handler 80 analyzes the virtual machine stack of VM context 86 to trace the exception back to a triggering instruction. Upon finding the triggering instruction, VM exception handler 80 determines whether the address of the triggering instruction is included in one of compiled traces 72, which indicates the thread threw the exception while executing one of compiled traces 72. In another example, interpreter 54 sets a dispatched flag in a corresponding one of JIT profiles 66 for a compiled trace 72 prior to dispatching the compiled trace. When the execution thread returns to interpreter 54 from the compiled trace, interpreter 54 clears the dispatched flag. In such examples, VM exception handler 80 determines whether a dispatched flag for any JIT profiles 66 is set. If so, this indicates the execution thread threw the exception while executing one of compiled traces 72.

If VM exception handler 80 successfully identifies the error-causing one of compiled traces 72, VM exception handler 80 sets an error flag in the corresponding one of JIT profiles 66 for the identified trace to indicate the trace should be interpreted, rather than natively executed. In some embodiments, VM exception handler 80 modifies a trace-head to prevent the trace from jumping to or otherwise invoking the error-causing one of compiled traces 72 while being interpreted by interpreter 54.

In some instances, VM exception handler 80, upon successfully identifying the error-causing one of compiled traces 72, attempts to roll back the execution thread to a restore point, i.e., a state from which virtual machine 50 is able to recover and then continue execution in a manner that achieves a correct outcome for program code 52. The restore point may include a memory address that stores an executable instruction at which a restored thread should resume execution. In some embodiments, JIT compiler 60 creates restore points for compiled traces 72 and specifies associated instructions that, when executed by VM exception handler 80 upon catching an exception, can roll back the execution thread to a restore point. The associated instructions may, for example, also cause the VM exception handler 80 to direct interpreter 54 to begin interpreting program code at an program code address that corresponds to a restore point. In this way, execution may continue using a trusted execution mode (i.e., interpreter 54 executing program code). In some embodiments, VM exception handler 80 reads a previously stored subset of VM context 86 to restore VM context 86 to a restore point and modifies the VM program counter to return the active thread to the instruction represented by restore point.

In some instances, an execution thread may execute past a "point of no return," beyond which roll back may not be possible. For example, an execution thread may execute a trace that causes values in registers and/or object fields to be overwritten. In such instances, the previous values are no longer available for roll back (unless such values were recorded as part of a restore point). If an error occurs after an overwrite, but before all such values are overwritten as part of the trace execution, then VM exception handler 80 may be unable to restore the previous values of the registers and/or object fields. That is, VM exception handler 80 may not be able to determine which values were/were not overwritten during trace execution and therefore may be unable to restore all previous values. If the execution thread has executed past such a point in the error-causing trace, VM exception handler 80 allows virtual machine 50 to crash.

Regardless of whether VM exception handler 80 is able to identify the error-causing trace or roll back the trace, the VM exception handler directs logger 84 to log information about the error. Logger 84 may log, for example, the full program code or trace-head instruction for the failed trace, the compiled code for the failed trace, and/or elements of the system state (e.g., a core dump of VM context 86). If VM exception handler 80 is unable to determine whether the execution thread was executing one of compiled traces 72 to cause the received exception, VM exception handler 80 may allow virtual machine 50 to crash.

Figure 3:
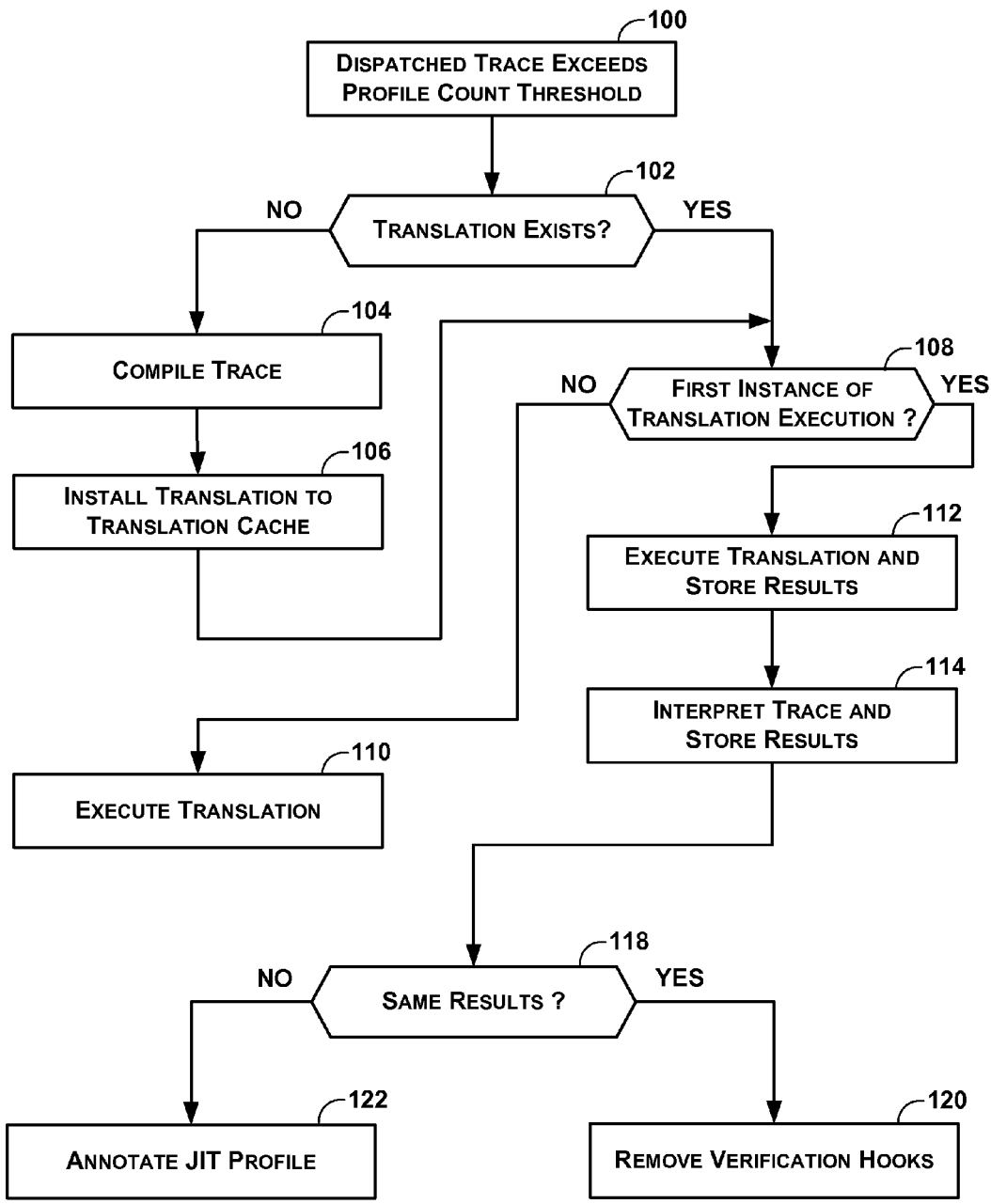
FIG. 3 is a flow chart illustrating an example operation of a virtual machine to perform one or more of the compiled trace verification techniques herein described.

FIG. 3 is a flow chart illustrating an exemplary operation of a virtual machine, such as virtual machine 50 of FIG. 2, to perform the compiled trace verification techniques herein described. For purposes of illustration only, it will be assumed that the process shown in FIG. 3 is performed by virtual machine 50. Interpreter 54 dispatches a trace for execution, and profiler 58 determines the trace has a profile count that exceeds a threshold for compilation (100). Interpreter 54 therefore determines whether a translation, or corresponding compiled version of the trace, exists in translation cache 70 (102). If the trace has not yet been compiled (NO branch of 102), interpreter 54 directs JIT compiler 60 to compile the trace (104). JIT compiler 60, upon completing compilation, installs the new translation to translation cache 70 as one of compiled traces 72 (106). Once a translation for the trace is present in the translation cache (YES branch of 102), interpreter 54 determines whether the translation is to be executed for the first time (108). If not (NO branch of 108), interpreter 54 dispatches the translation for native execution (110).

If, however, the interpreter 54 determines the translation is to be executed for the first time (YES branch of 108), the interpreter directs verification module 76 to verify the translation. To verify the translation, verification module 76 first causes the translation to execute natively and stores results for the native execution mode (112). Next, verification module 76 directs interpreter 54 to execute the corresponding trace for the translation and to store the interpreted results (114). Verification module 76 then compares the native execution mode results with the interpreted results to determine whether the results for the two execution modes match (118).

If the results match (YES branch of 118), verification module 76 removes verification hooks from the translation (120) to enable future dispatches of the translation to avoid further verification and run at full speed. If the results diverge, however (NO branch of 118), verification module 76 annotates the corresponding one of JIT profiles 66 for the trace to indicate future trace dispatches should not be executed natively due to erroneous or otherwise inconsistent results with those produced by interpreter 54 (122). In this way, virtual machine 50 may leverage a trusted execution mode (i.e., interpreter 54) to verify the operation of another execution mode (i.e., native execution) and thereby facilitate program correctness and stability.

Figure 4:
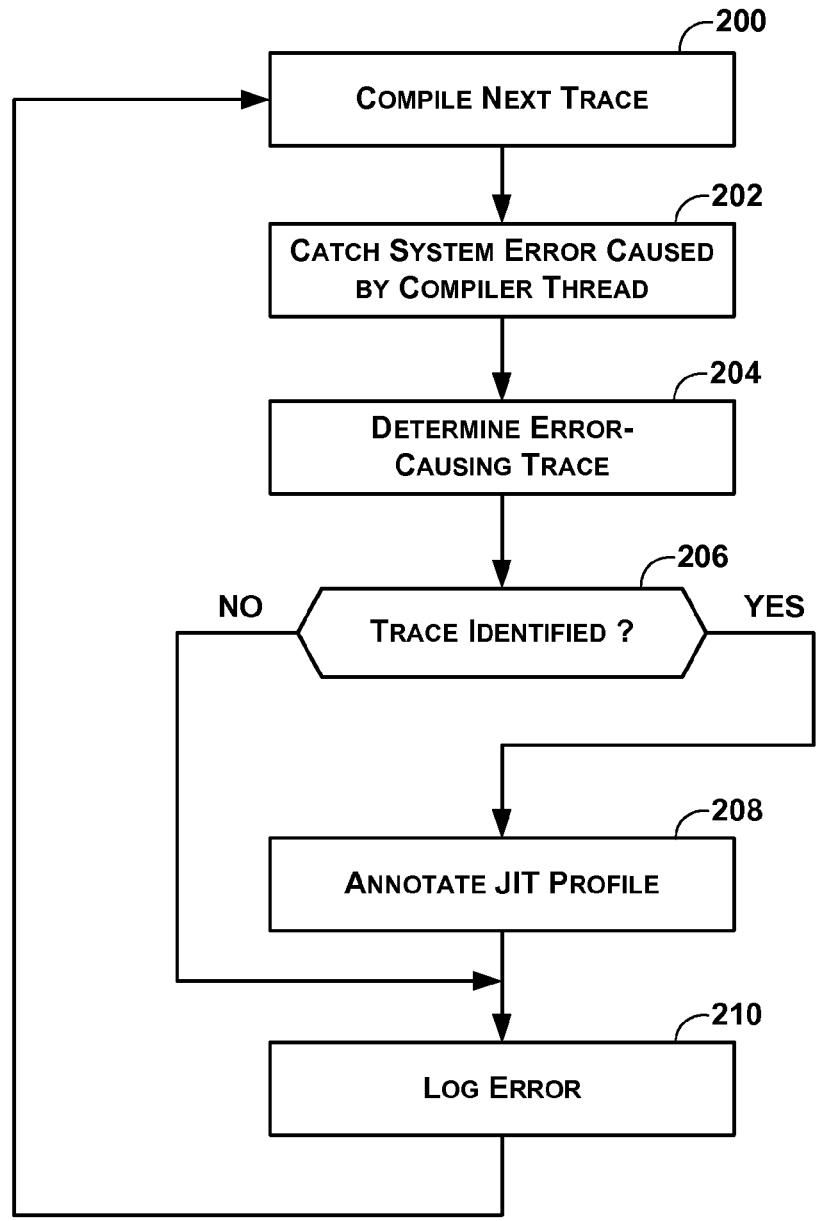
FIG. 4 is a flowchart illustrating an example operation of a virtual machine to catch system errors caused by a compiler thread in accordance with one or more of the techniques of this disclosure.

FIG. 4 is a flowchart illustrating an exemplary operation of a virtual machine, such as virtual machine 50 of FIG. 2, to catch system errors caused by a compiler thread in accordance with the techniques of this disclosure. For purposes of illustration only, it will be assumed that the process shown in FIG. 4 is performed by virtual machine 50. JIT compiler 60 compiles traces for which interpreter 54 has issued a build request (200). When, during a compilation procedure for a particular trace, JIT exception handler 74 catches an exception for a system error (202), the JIT exception handler attempts to determine the error-causing trace (204). That is, JIT exception handler 74 attempts to determine the particular trace being compiled at the time of the exception. If JIT exception handler 74 is unable to identify the trace (NO branch of 206), the JIT exception handler directs logger 84 to log the system error (210). If, however, JIT exception handler 74 successfully identifies the error-causing trace (YES branch of 206), the JIT exception handler annotates the one of JIT profiles 66 in JIT profiling table 64 that corresponds to the trace to indicate compiling the trace with JIT compiler 60 induces system errors (208). After annotating the JIT profile in JIT profiling table 64, JIT exception handler 80 directs logger 84 to log the system error (210).

Figure 5:
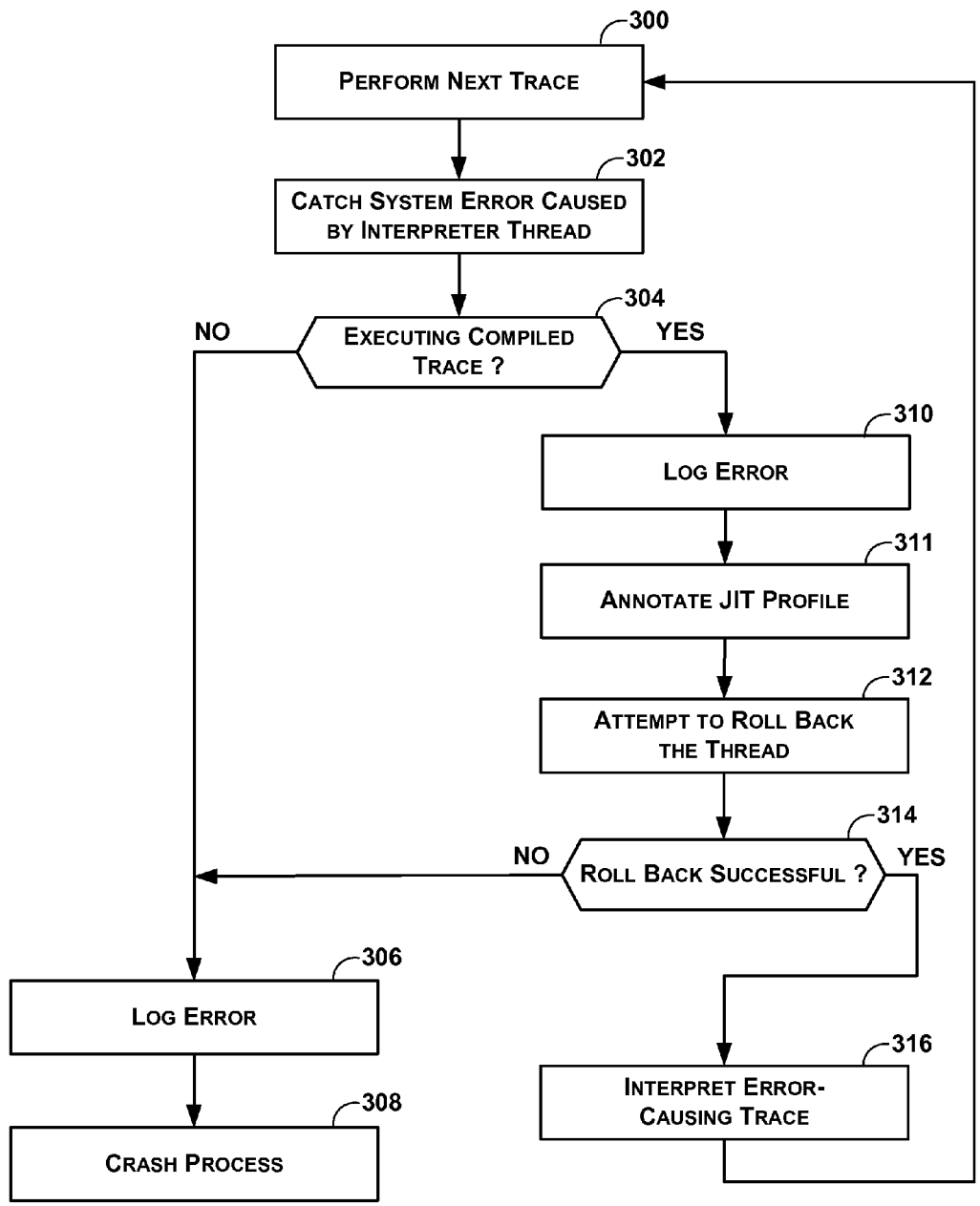
FIG. 5 is a flow chart illustrating an example mode of operation of a virtual machine to catch system errors triggered by an interpreter thread.

FIG. 5 is a flow chart illustrating an exemplary mode of operation of a virtual machine, such as virtual machine 50 of FIG. 2, to catch system errors triggered by an interpreter 54 thread. For purposes of illustration only, it will be assumed that the process shown in FIG. 5 is performed by virtual machine 50. In this exemplary operation, interpreter 54 executes a particular trace (300), which causes VM exception handler 80 to catch a system error (302). VM exception handler 80 determines whether the interpreter 54 thread had dispatched the trace for native execution as a corresponding translation (304). When trace interpretation, rather than native execution, caused the error (NO branch of 304), VM exception handler 80 directs logger 84 to log the system error (306) and allows the virtual machine 50 process to crash (308).

When native execution of a translation caused or otherwise resulted in error, however (YES branch of 304), VM exception handler 80 directs logger 84 to log the error (310) and annotates the corresponding one of JIT profiles 66 for the error-causing trace (311) to indicate the trace causes or otherwise results in a system error.

VM exception handler 80 then attempts to roll back the thread to a restore point for the failed trace (312). For example, VM exception handler 80 may restore elements of VM context 86, including a virtual machine program counter, to a restore point. If VM exception handler 80 successfully rolls back the thread, the VM exception handler directs interpreter 54 to continue the trace in the interpretation execution mode to prevent future compilation-related errors when executing the trace (316).

If virtual machine 50 was not executing a compiled trace (i.e., translation) (NO branch of 304) or VM exception handler 80 is unable to roll back the thread to a restore point for the trace (NO branch of 314), then VM exception handler directs logger 84 to log the error received in the exception (306) and allows the virtual machine 50 process to crash. By performing the above-described techniques, virtual machine 50 may improve a balance between system speed and stability in a dual-execution mode environment by executing compiled traces when possible and appropriate, while interpreting corresponding traces when necessary.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, flash memory, magnetic or optical data storage media, and the like. The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described herein. These and other embodiments are within the scope of the following claims.

The invention claimed is:

1. A method comprising:
   partitioning a plurality of program instructions into a plurality of traces for execution by a virtual machine operating on a computing device, wherein the virtual machine has first and second modes of execution, and wherein each of the plurality of traces comprises one or more of the plurality of program instructions;
   compiling a first trace in the plurality of traces to native machine code for the computing device;
   applying the second mode of execution to the first trace;
   determining an error condition caused by executing the compiled first trace using the second mode of execution;
   associating the first trace with the error condition using a record for the first trace in a trace repository;
   creating a restore point for the first trace that represents a state of the virtual machine prior to completing application of the second mode of execution to the first trace;
   terminating the virtual machine after executing the compiled first trace past a point representing a native machine code instruction from which the virtual machine is unable to recover to the restore point; and
   after determining the error condition, applying the first mode of execution to the first trace to recover the virtual machine from the error condition.

2. The method of claim 1, further comprising:
   applying the first mode of execution to the first trace to generate a first result for the first trace,
   wherein applying the second mode of execution to the first trace generates a second result for the first trace, and
   wherein determining the error condition comprises identifying a difference between the first result and the second result.

3. The method of claim 1, further comprising:
   attempting to compile the first trace to native machine code for the computing device;
   determining the error condition is caused by attempting to compile the first trace to the native machine code; and
   associating the first trace with the error condition using a record for the first trace in a trace repository.

4. The method of claim 3, further comprising:
   determining, from the record for the first trace, whether the first trace is associated with the error condition; and
   applying the first mode of execution to the first trace when the first trace is associated with the error condition.

5. The method of claim 1, further comprising:
   creating a restore point for the first trace that represents a state of the virtual machine prior to completing application of the second mode of execution to the first trace; and
   after determining the error condition, returning the state of the virtual machine to the state represented by the restore point.

6. The method of claim 1, further comprising:
   determining, from the record for the first trace, whether the first trace is associated with the error condition; and
   applying the first mode of execution to the first trace when the first trace is associated with the error condition.

7. The method of claim 1, wherein applying the first mode of execution to the first trace to recover the virtual machine from the error condition comprises restarting the virtual machine and applying the first mode of execution to the first trace when the first trace is associated with the error condition.

8. The method of claim 1,
   wherein the first mode of execution comprises interpreting program instructions using an interpreter, and
   wherein the second mode of execution comprises native execution of compiled program instructions.

9. The method of claim 8,
   wherein applying the second mode of execution to the first trace in the plurality of traces comprises compiling the first trace to generate a translation that includes one or more native machine code instructions and executing the translation with the computing device, and
   wherein applying the first mode of execution to the first trace comprises interpreting the program instructions of the first trace.

10. The method of claim 1, wherein compiling the first trace to native machine code for the computing device comprises compiling the program instructions of the first trace using a just-in-time compiler.

11. A non-transitory computer-readable medium comprising instructions for causing a programmable processor to:
    partition a plurality of program instructions into a plurality of traces for execution by a virtual machine operating on a computing device, wherein the virtual machine has first and second modes of execution, wherein each of the plurality of traces comprises one or more of the plurality of program instructions;
    compile a first trace in the plurality of traces to native machine code for the computing device;
    apply the second mode of execution to the first trace;
    determine an error condition caused by executing the compiled first trace using the second mode of execution;
    associate the first trace with the error condition using a record for the first trace in a trace repository;
    create a restore point for the first trace that represents a state of the virtual machine prior to completing application of the second mode of execution to the first trace;
    terminate the virtual machine after executing the compiled first trace past a point representing a native machine code instruction from which the virtual machine is unable to recover to the restore point; and
    after determining the error condition, apply the first mode of execution to the first trace to recover the virtual machine from the error condition.

12. The non-transitory computer-readable medium of claim 11, further comprising instructions to cause the programmable processor to:
    apply the first mode of execution to the first trace to generate a first result for the first trace;
    apply the second mode of execution to the first trace to generate a second result for the first trace; and
    determine the error condition by identifying a difference between the first result and the second result.

13. The non-transitory computer-readable medium of claim 11, further comprising instructions to cause the programmable processor to:
  attempt to compile the first trace to native machine code for the computing device;
  determine the error condition is caused by attempting to compile the first trace to the native machine code; and
  associate the first trace with the error condition using a record for the first trace in a trace repository.

14. The non-transitory computer-readable medium of claim 13, further comprising instructions to cause the programmable processor to:
  determine, from the record for the first trace, whether the first trace is associated with the error condition; and
  apply the first mode of execution to the first trace when the first trace is associated with the error condition.

15. The non-transitory computer-readable medium of claim 11, further comprising instructions to cause the programmable processor to:
  create a restore point for the first trace that represents a state of the virtual machine prior to completing application of the second mode of execution to the first trace; and
  after determining the error condition, return the state of the virtual machine to the state represented by the restore point.

16. The non-transitory computer-readable medium of claim 11, further comprising instructions to cause the programmable processor to:
  determine, from the record for the first trace, whether the first trace is associated with the error condition; and
  apply the first mode of execution to the first trace when the first trace is associated with the error condition.

17. The non-transitory computer-readable medium of claim 11, wherein, to apply the first mode of execution to the first trace to recover the virtual machine from the error condition, the instructions cause the programmable processor to restart the virtual machine and apply the first mode of execution to the first trace when the first trace is associated with the error condition.

18. The non-transitory computer-readable medium of claim 11,
  wherein the first mode of execution comprises an interpreter to interpret program instructions, and
  wherein the second mode of execution comprises native execution of compiled program instructions.

19. The non-transitory computer-readable medium of claim 18, further comprising instructions to cause the programmable processor to:
  apply the second mode of execution to the first trace in the plurality of traces by compiling the first trace to generate a translation that includes one or more native machine code instructions and executing the translation with the computing device; and
  apply the first mode of execution to the first trace by interpreting the program instructions of the first trace.

20. The non-transitory computer-readable medium of claim 11, further comprising instructions to cause the programmable processor to:
  compile the first trace to native machine code for the computing device by compiling the program instructions of the first trace using a just-in-time compiler.

21. A computing device, comprising:
  one or more processors;
  a virtual machine having first and second modes of execution and operable by the one or more processors to:
  partition a plurality of program instructions into a plurality of traces for execution, wherein each of the plurality of traces comprises one or more of the plurality of program instructions;
  compile a first trace in the plurality of traces to native machine code for the computing device; and
  apply the second mode of execution to the first trace;
  means for determining executing the compiled first trace using the second mode of execution causes an error condition,
  wherein the virtual machine is further operable by the one or more processors to:
  associate the first trace with the error condition using a record for the first trace in a trace repository;
  create a restore point for the first trace that represents a state of the virtual machine prior to completing application of the second mode of execution to the first trace;
  terminate the virtual machine after executing the compiled first trace past a point representing a native machine code instruction from which the virtual machine is unable to recover to the restore point; and
  after determining the error condition, apply the first mode of execution to the first trace to recover the virtual machine from the error condition.

* * * * *